United States Patent [19]

Berends et al.

[11] 4,150,598
[45] Apr. 24, 1979

[54] RADIAL ARM SAW GUARD

[75] Inventors: Emerson R. Berends; Charles D. Guntharp, both of Tupelo, Miss.

[73] Assignee: Rockwell International Corporation, Pittsburgh, Pa.

[21] Appl. No.: 859,829

[22] Filed: Dec. 12, 1977

[51] Int. Cl.² .......................... B27B 9/00; B26D 7/22
[52] U.S. Cl. .................................. 83/478; 83/440.2; 83/544
[58] Field of Search .................. 83/440.2, 478, 544

[56] References Cited

U.S. PATENT DOCUMENTS

| 3,884,101 | 5/1975 | Silkin | 83/478 X |
| 3,913,437 | 10/1975 | Speer et al. | 83/478 |
| 3,965,787 | 6/1976 | Plischke | 83/478 |
| 4,041,823 | 8/1977 | Ashbrook | 83/478 |

Primary Examiner—Willie G. Abercrombie

[57] ABSTRACT

A lower guard assembly for both sides of the blade, which retracts a minimal amount while cutting, providing a maximum of blade enclosure and consequent protection for the operator.

4 Claims, 3 Drawing Figures

RADIAL ARM SAW GUARD

BACKGROUND OF THE INVENTION

The present invention relates to a saw guard assembly for a radial arm saw, and more particularly to a lower guard assembly which provides a maximum of protection for the saw operator while at the same time allowing ease of movement of the saw in the various cutting positions without jamming the guard against the work material.

Prior art saw guards for radial arm saws have customarily provided a housing surrounding the upper portion of the blade. Some of these upper guards were adjustable peripherally around the blade, but still only covered approximately half the blade cutting edge. Some efforts have been expended previously to provide a retractable guard (or guards) for the remainder of the blade. U.S. Pat. No. 3,913,437, to Speer, et al, is an example of this effort. Other patents include U.S. Pat. Nos. 3,884,101, to Silkin, and 2,589,309, to Tompkins.

The prior art lower guards, including those mentioned above have been unsatisfactory because of interference with use of the saw in some attitudes in which the saw blade is required to move through the workpiece. As a consequence, some prior art radial arm saws were produced with the lower portion of the blade exposed, and others tempted the operators into removing the lower guard portion.

SUMMARY OF THE INVENTION

Accordingly, it is an object of the present invention to provide a safety guard for the teeth of a circular saw at the lower (cutting) section of its periphery; one which will not interfere with proper operation of the saw.

It is also an object of the present invention to provide a lower saw guard assembly for a radial arm saw which avoids the possibility of jamming against the workpiece when used in the various attitudes which are necessary for the desired cuts.

It is also an object of the present invention to provide a lower guard assembly for a radial arm saw which presents minimal resistance to movement of the saw through the workpiece in either direction.

A further important object of this invention is the provision of a radial arm saw blade guard assembly which shields the entire periphery of the blade from accidental contact from either side.

The guard assembly of the present invention utilizes arcuate leaves pivotally mounted on the outer face of the well-known conventional upper guard. These leaves are linked together in such a manner that they may be pushed up above the axis of the arbor shaft, out of the way for changing blades, or the like, yet normally are positioned adjacent the blade and radially outwardly thereof. In addition, an arcuate leaf is suspended on the inner side, also normally radially outwardly of the blade. This inner lower guard sub-assembly is suspended by slotted links that allow the guard to be moved upwardly by contact with the workpiece, but is prevented from contacting the saw arbor shaft.

DESCRIPTION OF THE INVENTION

Figures 1, 2:
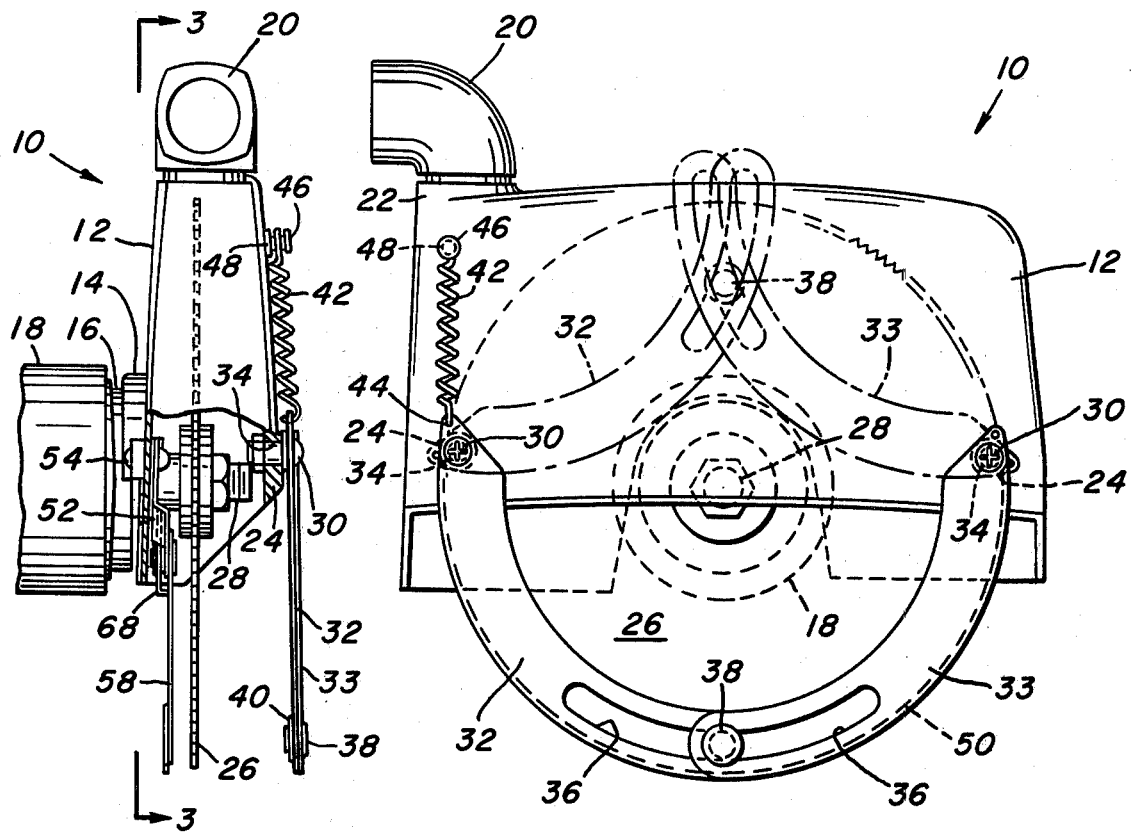
FIG. 1 is a side elevation view of a radial arm saw guard of the present invention mounted on a saw arbor shaft.
FIG. 2 is a rear view of the guard of FIG. 1, with a portion broken away, and a saw blade mounted on the arbor.

FIG. 1 is a view of the guard assembly 10 of the present invention. Upper guard 12 is conventional, having a shroud-like shape for enclosing the upper portion of the blade. This upper guard 12 carries a mounting flange 14 (FIGS. 2 and 3) for fastening to the arbor housing 16, which is usually integral with motor housing 18, a portion of which is shown in FIG. 2. The method of fastening upper guard 12 to arbor housing 16 can be any of several well-known methods and is not explicitly detailed herein. Upper guard 12 is also equipped with a sawdust chute connection 20, which is swivelable in its socket 22, and provision for attaching to a dust collector (not shown) can be made.

All of the above is conventional, and is in wide usage today, and has been for some time back. The novel lower guard sub-assemblies which are fixed on the upper guard will now be described. In describing them, the usual terminology will be employed, such as "outer" to denote something on the side of the cutting blade remote from the motor, and "inner" to denote things mounted between the blade and the motor. "Upper" and "lower" are used with reference to the axis of the arbor shaft when it is in a horizontal attitude, and radial references are also to the axis of the arbor, and the radial extent of the blade.

Referring now to FIGS. 1 and 2, it can be seen that integral bosses 24 are provided on the exterior surface of the outer portion of the upper guard. These are located radially outwardly of a blade 26, and above a horizontal plane through the axis of arbor 28. One boss is in the front portion, and one in the rear, of the upper guard, and they are each drilled to receive a bolt 30.

Each bolt 30 pivotally mounts an arcuate leaf 32 and 33, respectively, by an end. These leaves are made identical, with a hole 34 for receiving respective bolts 30, and a longitudinal, closed slot 36 in the other end. In assembly, the left-hand leaf 32 is mounted with one side facing the saw blade and the right-hand leaf 33 is mounted with the opposite side facing the saw blade. The leaves 32 and 33 are connected together by a pin 38, slidable in the slots 36. Pin 38 is retained in the slots by a snap ring 40. These leaves 32 and 33 are pivotable about bolts 30, and the dotted lines represent an example of how far these leaves may be moved. This is to facilitate blade changing and the like. However, the leaves are spring-biased to the position shown in the solid lines by a spring 42, which has one end fixed in a hole 44 provided in the leaf 32, and the other end over a bolt 46 threaded into a boss 48 provided on the upper guard outer face. A dash line 50 indicates the periphery of the blade in FIG. 1, when one is installed as shown in FIG. 2.

Figure 3:
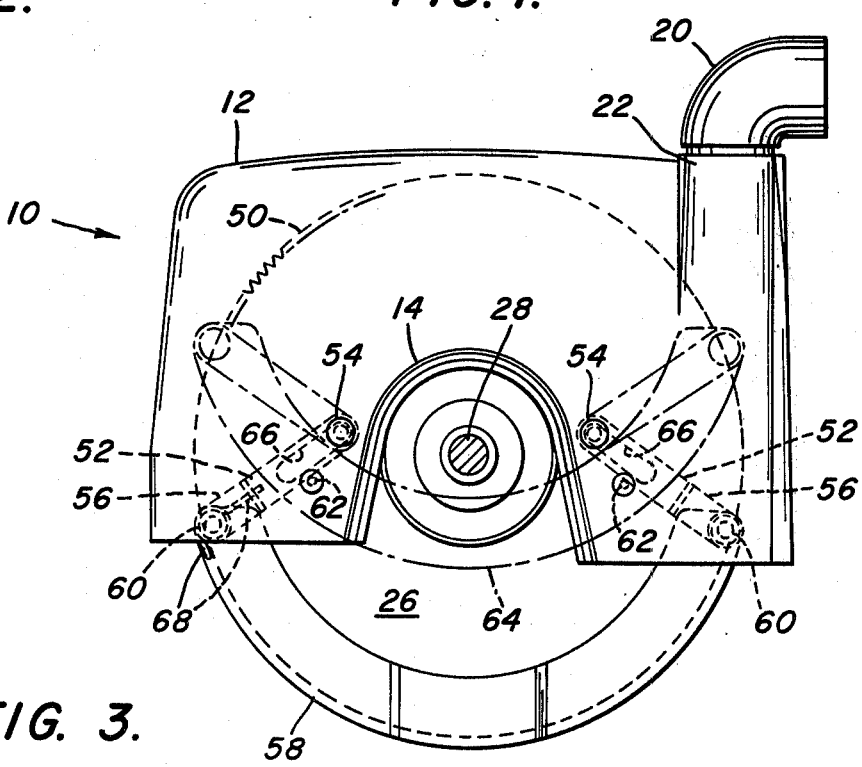
FIG. 3 is a view along the line 3—3 of FIG. 2.

The lower outer guard sub-assembly described above protects the blade from accidental contact from the outer side, as well as the operator and the work from moving sideways into the cutting teeth of the blade. To protect against movement from the other side, the lower inner guard shown in FIGS. 2 and 3 are devised. Looking now at these figures, it will be seen that slotted links 52 are pivotally and slidably mounted by bolts 54 to the inner surface of the inner portion of the upper guard. These links have an offset portion 56 which pivotally support a leaf 58 by pivot pins 60. Pins 62 mounted below bolts 54 limit the swing of links 52 inwardly. The normal (or "rest") position is shown with links 52 resting against pins 62, while the maximum allowable upward travel is indicated by the dashed outline 64. The presence of arbor shaft 28 necessitates limiting the upward travel as shown. The links 52 are slotted as shown at 66 for more flexible movement of leaf 58 upon encountering the workpiece (not shown) when moving the saw in either direction. A spring 68 is provided to bias the assembly to the extended position shown. In this position, it will be seen that leaf 58 covers the teeth from the back side not covered by the upper guard.

It can thus be seen that these two novel lower guard sub-assemblies combine with the upper guard to completely enclose the teeth of the saw blade from either side, yet are flexible enough to allow compound cuts to be effected, and routine blade-changing and the like, without removing the guards.

We claim:

1. A guard assembly for a power saw having a cutting blade suspended above a work support, comprising:
    an upper guard enclosing substantially half of said cutting blade;
    an outer lower guard assembly having a pair of leaves each with one end pivotally fixed on said upper guard and with respective lower ends being arcuately slotted and slidably connected to each other by a connecting pin, said slots having sufficient length to permit pivoting of said leaves to a position above the shaft of said power saw, and a spring biasing said leaves to an extended position, said leaves outer arcuate edges being of a radial dimension greater than said cutting blade when in said extended position.

2. The guard assembly of claim 1, further comprising an inner lower guard assembly having slotted links slidably mounted on said upper guard, said links pivotally supporting an arcuate leaf from the link ends remote from said upper guard, said arcuate leaf normally extending outwardly of said cutting blade when in the extended position.

3. A guard assembly for a radial arm saw, comprising:
    an upper guard section mounted on the motor housing enclosing the upper portion of the blade of said saw;
    an outer lower guard sub-assembly normally guarding the exposed balance of the blade cutting edge not covered by said upper guard section, said outer lower guard assembly being mounted on said upper guard section on a surface remote from said motor housing, and having a pair of arcuate leaves pivotally mounted on said upper guard radially outwardly of said blade;
    said arcuate leaves each having a closed longitudinal slot in the end remote from their respective pivoted ends;
    a pin in said slot slidingly connecting said leaves together, said slots being of sufficient extent to permit pivotal movement of said leaves to a point above a line connecting said pivoted ends; and,
    a spring biasing said leaves to the extended position away from said upper guard.

4. The guard assembly of claim 3, further comprising an inner lower guard sub-assembly, comprising:
    a pair of pivot pins mounted on the inside of the inner wall of said upper guard, said pins being on a line above the axis of the arbor of said saw, and radially inward of the periphery of said saw blade;
    a slotted link mounted on each said pivot pin for rotation and sliding movement;
    an arcuate leaf pivotally suspended by its ends from said slotted links; and
    stop pins mounted to limit the downward and inward travel of said links;
    said slots in said links being of an extent to limit the inward movement of said links towards said arbor; and,
    the external periphery of said arcuate leaf having a radius greater than said blade.

* * * * *